(12) United States Patent
Kinsey et al.

(10) Patent No.: US 11,165,835 B2
(45) Date of Patent: Nov. 2, 2021

(54) DYNAMICALLY EXPANDABLE CONFERENCE CALL SYSTEM USING ACTIVE LOAD BALANCING

(71) Applicant: T-Mobile USA, Inc., Bellevue, WA (US)

(72) Inventors: Michele Kinsey, Shoreline, WA (US); Jonathan Alexander Pastore, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 27 days.

(21) Appl. No.: 16/720,741

(22) Filed: Dec. 19, 2019

(65) Prior Publication Data
US 2021/0194937 A1 Jun. 24, 2021

(51) Int. Cl.
*H04L 29/06* (2006.01)
*H04M 3/56* (2006.01)

(52) U.S. Cl.
CPC ...... *H04L 65/1069* (2013.01); *H04L 65/1093* (2013.01); *H04L 65/4015* (2013.01); *H04M 3/567* (2013.01)

(58) Field of Classification Search
CPC ............. H04L 65/1069; H04L 65/1093; H04L 65/4015; H04M 3/567
See application file for complete search history.

(56) References Cited

U.S. PATENT DOCUMENTS

| | | | | |
|---|---|---|---|---|
| 5,867,495 A | * | 2/1999 | Elliott | H04Q 3/0029 370/352 |
| 6,731,625 B1 | * | 5/2004 | Eastep | H04L 29/06 370/352 |
| 9,282,130 B1 | * | 3/2016 | Goepp | H04L 43/08 |

* cited by examiner

*Primary Examiner* — Kristie D Shingles
(74) *Attorney, Agent, or Firm* — Lee & Hayes, P.C.

(57) ABSTRACT

Systems and methods for providing a dynamically expandable conference call system using load balancing are described herein. Various examples use a media replication server. The media replication server accesses state information of one or more media control units. The state information is used to instantiate one or more media control unit high availability pairs. The media replication server further replicates media received into the conference call system by transmitting the received media to both an active media control unit and a standby media control unit. The media replication server may make modifications to the media control units handling a conference call to adjust for varying conditions such as a failure of one or more of the media control units or the addition of clients to the conference call.

20 Claims, 6 Drawing Sheets

DYNAMICALLY EXPANDABLE CONFERENCE CALL SYSTEM USING ACTIVE LOAD BALANCING

BACKGROUND

Conventional conference call systems are typically static in nature. Resources for a particular conference call are designated to handle the conference call. The failure of one component or part of the media storage system of a conference call system can result in media that has been stored being lost and prevent media from being recorded at the time of the conference call. Further, conventional conference call systems are also often difficult to scale during use. For example, if a conference call is setup with a specific number of lines that can be used to call in, once the number is reached, the conference call system may block any additional callers attempting to join the conference call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
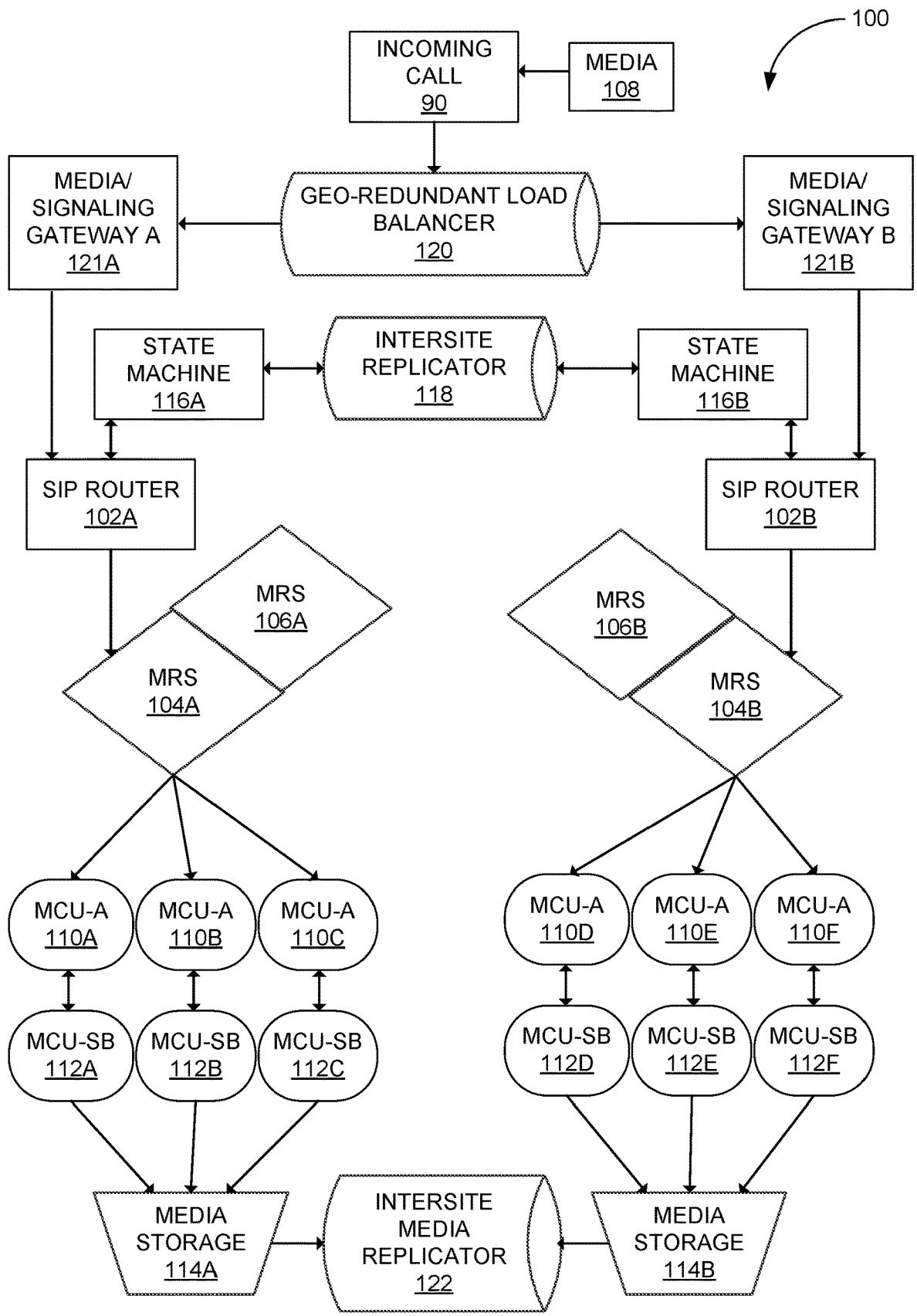
FIG. 1 depicts a system for providing a dynamically expandable conference call system using load balancing, in accordance with some examples of the present disclosure.

Examples of the present disclosure can comprise systems and methods for providing a dynamically expandable conference call system using load balancing. In some examples, a conference call system is designed to be a dynamically expandable conference call system. Conference call system resources can be pre-allocated to handle an initial setup of the conference call. A load balancing system can be used to monitor the "health" of the conference call system during use.

As used herein, the "health" of the conference call system means a measurement of the stability of the conference call system as determined by the facilitators of the conference call system. For example, if all the conference call system resources are 80% or less utilized, the health of the conference call system, as determined by the facilitators of the conference call system, may be measured as "high" because the resources are not being used at full capacity. In another example, another measure of the health of the resources of the conference call system may be the availability of rapidly, integrable additional resources. For example, even though the resources of the conference call system may only be used at an 80% capacity, if there are no integrable important or vital additional resources available, such as a second media capture resource, the health of the system may be lower than the highest measure available.

In some examples, a load balancer checks resource allocation of the conference call system. If the load balancer determines that a status of the conference call system falls below a predetermined, acceptable status, e.g. from "healthy" to "warning," the load balancer can activate additional resources to return the conference call system to a healthy, or optimal, status. For example, the load balancer may determine that a conference call resource is being operated at or near capacity. The operation at near capacity may be caused for various reasons, including, but not limited, additional callers logging into the system, a failure or downgrade of the operational capacity of various conference call system resources, and the like.

To dynamically expand a conference call system to, for example, increase the capacity of the system, provide for various redundancies, or to increase a measurement of the health of the system, various examples of the presently disclosed use a media load balancer. In some examples, the media load balancer monitors activity of one or more media control units and initializes or places on standby various resources to decrease the probability of a system error. In some examples, the media control unit (MCU) is a conference controller that controls the receipt, rendering, and storage of media during a conference call. The media load balancer enables one or more active or standby media control units depending on the status of the system, described in more detail in FIG. 1.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks (mobile, wired, and wireless) that provide video calling such as, for example, Internet of Things (IoT), machine-to-machine (M2M), sixth-generation (6G), and other current and future networks.

FIG. 1 depicts a system 100 for providing a dynamically expandable conference call system for an incoming call 90 using load balancing. The system 100 includes a session initiation protocol (SIP) router 102A and a SIP router 102B. The SIP routers 102A and 102B are used to create, modify, and terminate two-party (unicast) or multiparty (multicast) sessions. In some examples, the SIP routers 102A and 102B are used for transmitting signaling data with a conference client application. For example, the SIP router 102A and/or the SIP router 102B, responsive to receiving a SIP INVITE pertaining to the incoming call 90, identifies a serving switch (a respective MGCF/call server) to process the incoming call 90 to a device or a conference call system, such as the system 100, used by a mobile communication network.

In a conventional conference call system, an SIP router routes incoming media received at the SIP router to an MCU. To provide for a dynamically expandable conference call system using load balancing, the system 100 includes an active media replication server (MRS) 104A and a standby MRS 106A. The active MRS 104A and the standby MRS 106A receive media 108 entering the system 100 through the incoming call 90 from the SIP router 102A and routes the media 108 to one or more high availability pairs of MCUs, described in more detail below. The media 108 can be various forms of media received from one or more participants in a conference call, such as, but not limited to, video, audio, documents, pictures, and the like.

As noted, the system 100 includes the active MRS 104A and the standby 106A. The active MRS 104A and the standby MRS 106A are paired as a "high availability pair." As used herein, "high availability," or HA, means that the functionality of a first resource is replicated in a second resource that is configured to be used in case of failure of the first resource. In the case of the active MRS 104A and the standby MRS 106A, the active MRS 104A and the standby MRS 106A are a high availability pair because the standby MRS 106A is ready to take over the functionality of the active MRS 104A upon a failure of the active MRS 104A.

The active MRS 104A (or the standby MRS 106A if the standby MRS 106A has taken over for the MRS 104A) receives the media 108 from the SIP router 102A and routes the media 108 to MCU HA pairs. Illustrated in FIG. 1 are MCU-A 110A, MCU-A 110B, and MCU-A 110C. The MCU-A 110A, MCU-A 110B, and MCU-A 110C are the active MCUs. As used herein, "active MCU" means an MCU that is controlling aspects of the conference call. Also illustrated in FIG. 1 are MCU-SB 112A, MCU-SB 112B, and MCU-SB 112C. The MCU-SB 112A, MCU-SB 112B, and MCU-SB 112C are standby MCUs. As used herein, a "standby MCU" is an MCU that receives media and other information as if acting as an active MCU, but is not the controlling, active MCU setup when a conference call is first established. In some examples, the standby MCUs, such as the MCU-SB 112A, MCU-SB 112B, and MCU-SB 112C, may have an IP address that allows the facilitation of the sharing of media between the active and standby MCUs. In some examples, a floating IP address is used for a standby MCU. As used herein, a floating or virtual address is an address that can be rapidly transferred from one entity, such as an active MCU, to a second entity, such as a standby MCU. In some examples, once an active MCU is detected to be non-functioning, for example, through the use of a heartbeat process, the IP address can be transferred to the standby MCU. In some examples, rather than using a heartbeat process, the floating IP address can be forced manually to be transferred.

As noted above, the MCUs are in HA pairs. In the example illustrated in FIG. 1, the MCU-A 110A is paired with the MCU-SB 112A, the MCU-A 110B is paired with the MCU-SB 112B, and the MCU-A 110C is paired with the MCU-SB 112C. During use, the media received at the SIP router 102A is replicated by the MRS 104A by being directed to both MCUs of a pair. For example, if the pair comprising MCU-A 110A and the MCU-SB 112A are paired, the MRS 104A will send the media to both the MCU-A 110A and the MCU-SB 112A. It should be noted that the number of HA pairs of MCUs illustrated in FIG. 1 is merely by way of example, as the system 100 can include more or fewer MCU HA pairs.

During a conference call, the MRS 104A places callers on one or more active (and standby) MCUs. For example, if the MCU-A 110A/B/C can each handle 20 callers, and the call requires 50 callers, the MRS 104A may place 17 callers on the MCU-A 110A, 17 callers on the MCU-A 110B, and 16 callers on the MCU-A 110C. The MRS 104A will transfer the media 108 to each of the HA MCU pairs. In the case of failure of an MCU-A, the associated MCU-SB will be brought online, and the call continued. For example, if the MCU-A 110A fails, MRS 104A will shift to the MCU-SB 112A as being the active MCU. The callers assigned to the MCU-A 110A will be transferred to the MCU-SB 112A and the call will be continued. The callers on the MCU-A 110B and the MCU-A 110C usually will not experience any service interruption. In some examples, another MCU (not shown) will be brought online and act as a standby MCU for the now active MCU-SB 112A.

In some examples, the MRS 104A may monitor for the health of the MCU pairs. For example, the MRS 104A may detect that the number of callers using or attempting to the use the system 100 exceeds a predetermined capacity of one or more of the MCU-A 110A/110B/110C. In this example, the MRS 104A may instantiate an additional MCU active/standby HA pair (not shown) and transfer current callers or new callers to the newly instantiated pair. In some examples, the MRS 104A may detect an overutilization of one of the MCU pairs. For example, the MRS 104A may detect that the MCU-A 110A is at 90 percent capacity and the MCU-A 110B is at 10 percent capacity. To balance the load during a conference call, the MRS 104A may transfer responsibility of a certain number of callers to balance out the load each MCU is carrying. For example, the MRS 104A may transfer a certain number of callers from the MCU-A 110A to the MCU-110B so that each of the MCU-A 110A and the MCU-A 110B are at fifty percent capacity.

In some examples, the MRS 104A may adjust the calling capacity of the MCU pairs in response to changing conditions of the conference call. For example, a conference call may initially be setup to handle 100 callers. The MRS 104A may place 50 callers on the MCU-A 110A/MCU-SB 112A pair and 50 callers on the MCU-A 110B/MCU-SB 112B pair. During the call, there may be one or more additional callers attempting to join the conference call. Rather than placing the additional callers on the currently instantiated MCU pairs, the MRS 104A may place the additional callers on the MCU-A 110C/MCU-SB 112C pair. In some examples, if additional MCU pairs beyond an initial HA pair are added, the initial HA pair may be termed a "parent conference" and the added or additional MCU HA pairs may be termed "children conferences." As used herein, a parent conference may control aspects of the conference call such as media encoding and storage logistics. For example, if the MCU-A 110A/MCU-SB 112A pair is a parent conference, the MCU-A 110A/MCU-SB 112A may determine that the media 108 is to be stored in a media storage 114. The media storage 114 may be of various types of media storage including, but not limited to, solid state, magnetic media, cloud-based, and the like.

In some examples, the system 100 may include additional expansion capabilities to dynamically provide for increased capacity or redundancy. Thus, the system 100 may also include additional resources that are functionally similar to the resources described above. The system 100 may include a state machine 116A. The state machine 116A monitors aspects of the system 100 such as the SIP router 102A, the active/standby MCU pairs, and the like. For example, the state machine 116A may monitor and record information such as conference call identification information, which MCU-A/MCU-SB pairs are being used, if an active MCU is disabled and a standby MCU is being used, the currently utilized capacity of one or more MCUs, and the like.

The state machine 116A can be used by the MRS 104A to store and retrieve information relating to the operation of the system. For example, as discussed above, the MRS 104A can add additional MCU pairs based on the load capacity or status of the MCUs. In these and other examples, the MRS 104A can access the state machine 116A to monitor the MCUs operational status. Based on the information received from the state machine 116A, the MRS 104A can route users to a particular MCU, add or remove MCUs, or place a standby MCU on an active status and transfer callers to the standby MCU, among other operations. In some examples, the information stored by the state machine 116A may also be stored at a state machine 116B using an intersite replicator 118. The intersite replicator 118 copies or receives a copy of the information being stored on the state machine 116A and replicates that information on state machine 116B. In that example, if the state machine 116A fails or is otherwise inoperable or unreliable, the state machine 116B can be used to take over the duties of the state machine 116A.

In some examples, the resources of the system 100 can be further dynamically expanded to, among other reasons, handle an increased number of callers, a decrease in capacity, and the like. For example, if the SIP router 102A becomes inoperable, the SIP router 102B may be placed in service.

In another example, the MRS 104A may use a geo-redundant load balancer 120 to route traffic to the MCU-A 110A/MCU-SB 112A pair, the MCU-A 110B/MCU-SB 112B pair, or the MCU-A 110C/MCU-SB 112C pair, as well as additional MCU pairs such as an MCU-A 110D/MCU-SB 112D pair, an MCU-A 110E/MCU-SB 112E pair, or an MCU-A 110F/MCU-SB 112F pair. In some examples, the geo-redundant load balancer 120 routes the incoming call 90 to media/signaling gateway A 121A or media/signaling gateway B 121B, which handle service requests, to a redundant site in the event a health check and/or an alarm indicates a site failover, such as one or more of the MCU-A 110A/MCU-SB 112A, MCU-A 110B/MCU-SB 112B, and MCU-A 110C/MCU-SB 112C pairs from the MRS 104A, is required. Users can be reconnected to a meeting using the same meeting ID and use one or more of the MCU-A 110D/MCU-SB 112D, MCU-A 110E/MCU-SB 112E, and MCU-A 110F/MCU-SB 112F pairs monitored by an MRS 104B and an MRS 106B. When using a different MRS 104B/MRS 106B pair, the meeting may be considered as being handled on a new "site." It should be understood that although the MCUs are illustrated as being a 1:1 pair, i.e. an active MCU paired with a standby MCU, the MCUs may be paired in other configurations. For example, the MCU-A 110D may be paired with the MCU-SB 112D as well as an additional MCU-SB such as the MCU-SB 112E.

In some examples, a site ID for the new site (i.e. the new MRS 104/MRS 106B pair) will not match the original meeting ID (i.e. the original MRS 104A/MRS106A pair), indicating that the media 108 may need to be concatenated or joined to another media file once a failed site is restored. A job to transcode, and/or join media is created in the state machine 116A. The media 108 transferred through the new site may be stored on a media storage 114B. In some examples, the media 108 stored in the media storage 114A, such as when the original site is being used, the media 108 may also be stored on the media storage 114B using an intersite media replicator 112 that replicates the media 108 being stored on the media storage 114A and transfers that media 108 to be stored on the media storage 114B.

Figure 2:
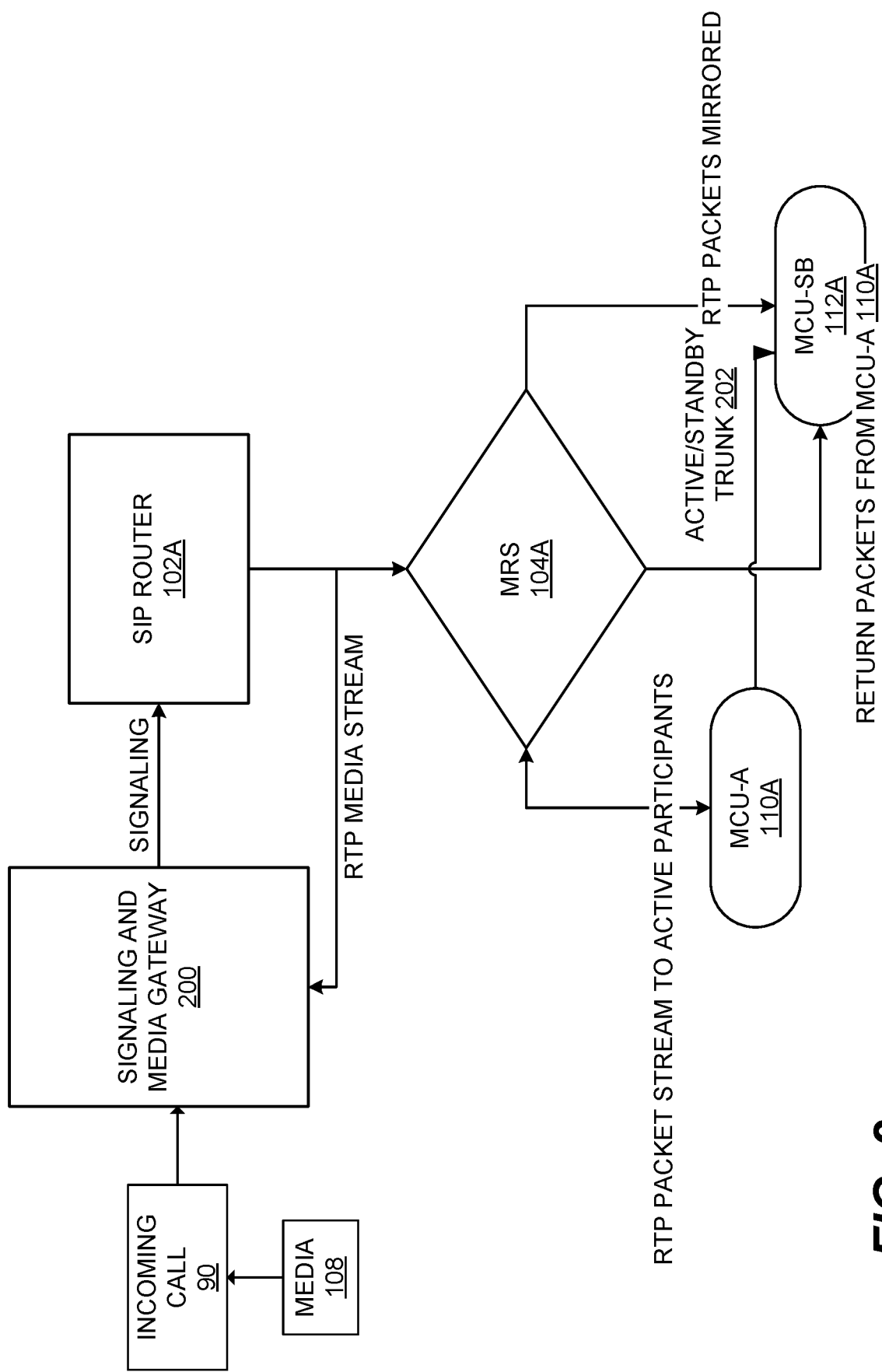
FIG. 2 depicts media control unit (MCU) load balancing to provide a dynamically expandable conference call system, in accordance with some examples of the present disclosure.

FIG. 2 depicts MCU load balancing to provide a dynamically expandable conference call system. Illustrated in FIG. 2 are the SIP router 102A, the MRS 104A, the MCU-A 110A, and the MCU-SB 112B. Also illustrated is a signaling and media gateway 200. The signaling and media gateway 200 receives media, such as the media 108 through the incoming call 90, from a telecommunication system. In the example illustrated in FIG. 2, the signaling and media gateway 200 is a signaling gateway whereby the media 108 can be passed between dissimilar networks. The MRS 104A receives the media 108 and replicates the media 108 to be sent as a real-time transport protocol (RTP) packet stream to the participants on the MCU-A 110A. The MCU-SB 112A also receives the RTP packet stream from the MRS 104A. Further, the MCU-SB 112A may also receive return packets from the MCU-A 110A. In some examples, an active/standby trunk 202 may also be instantiated when the MCU-A 110A is in operation. The active/standby trunk 202 between the MCU-A 110A and the MCU-SB 112A may allow the MCU-SB 112A to act as a passive participant during a call, allowing the MCU-SB 112A to collect the media 108 as well and made a local copy. In some examples, when an active MCU fails and the standby MCU becomes the active MCU, the active/standby trunk between the active MCU and the standby MCU is removed. In some examples, when an active MCU fails and a standby MCU comes online, another MCU may be instantiated to be a new standby MCU. A new trunk may be created between the newly activated standby MCU and the standby MCU that became an active MCU.

Figure 3:
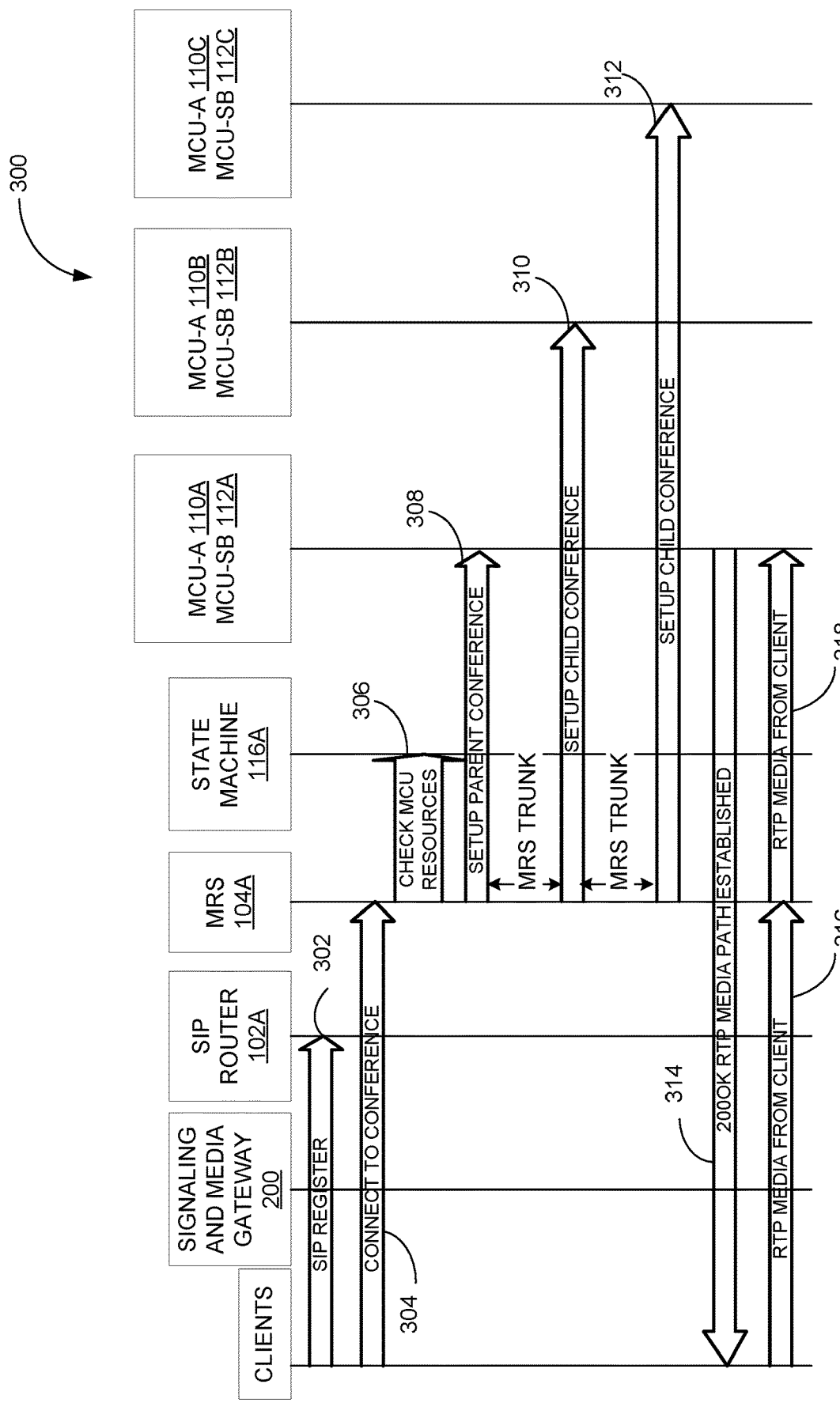
FIG. 3 is a flowchart depicting the dynamic scaling of a conference call, in accordance with some examples of the present disclosure.

FIG. 3 is a flowchart depicting a process 300 for the dynamic scaling of a conference call. The process 300 and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the process 300 commences at 302, wherein a SIP REGISTER communication is received by the SIP Router 102A. The SIP REGISTER communication is a request by one or more clients to join a conference call on the system 100.

The process 300 continues to 304, wherein the one or more clients are registered and are connected to the system 100. In some examples, the SIP REGISTER communication may instantiate a conference call if the conference call is not already instantiated.

The process 300 continues to 306, wherein the MRS 104A communicates with the state machine 116A to check for MCU resources. In the process 300 illustrated in FIG. 3, the MCU resources include the MCU pairs MCU-A 110A/MCU-SB 112A, MCU-A 110B/MCU-SB 112B, and MCU-A 110C/MCU-SB 112C. The active and standby MCUs are in a high availability configuration whereby the media 108 is replicated between the active MCU and the standby MCU for each pair.

The process 300 continues to 308, wherein a parent conference is setup. As described above, the initial HA pair may be termed a "parent conference" and the added or additional MCU HA pairs may be termed "children conferences." A parent conference may control aspects of the conference call such as media encoding and storage logistics. In the process 300, the parent conference is the MCU-A 110A/MCU-SB 112A pair, whereas the children conferences are the MCU-A 110B/MCU-SB 112B and MCU-A 110C/MCU-SB 112C pairs. In some examples, the parent conference can be established with fifteen (15) channels of thirty (30) ports. A "channel" is a line into which a client may access the conference. Therefore, 30 ports in this example means that 30 clients may be added to a conference. In an example where additional ports are required, for example if 90 ports are required, the MRS 104A may use additional channels on the parent conference or, as described in more detail below, may balance the load on the MCU pairs by adding channels on other MCU pairs.

To add additional channels, the process 300 continues to 310, wherein a child conference is setup. In this example, the child conference established at 310 is the MCU-A 110B/MCU-SB 112B pair. The MRS 104A may reserve 30 ports for an additional 30 channels on the MCU-A 110B/MCU-SB 112B pair, thereby adding an additional 30 channels to the 30 channels already established using the MCU-A 110A/MCU-SB 112A pair. The child conference of the MCU-A 110B/MCU-SB 112B pair joins the parent conference of the MCU-A 110A/MCU-SB 112A pair using a trunk.

To add additional channels, the process 300 continues to 312, wherein a second child conference is setup. In this example, the second child conference established at 312 is the MCU-A 110C/MCU-SB 112C pair. The MRS 104A may instantiate an additional 30 channels on the MCU-A 110C/MCU-SB 112C pair, thereby bring the total number of channels available for a conference call up to 90 channels. The child conference of the MCU-A 110C/MCU-SB 112C pair joins the parent conference of the MCU-A 110A/MCU-SB 112A pair using a trunk. Additional channels may be added by increasing the number of channels established in an MCU pair or by bringing online additional MCU pairs, such as the MCU-A 110D/MCU-SB 112D pair. The process 300 thereafter ends. It should be noted, however, that as described above, the MRS 104A can continuously monitor the health of the system 100 and add or remove MCU pairs as needed. It should be noted that in some examples, each child conference setup requires an additional channel as a trunk between the parent conference and the one or more child conferences, i.e. a hub-and-spoke design.

The process 300 continues to 314, where a 200 OK message is transmitted to the clients to inform the clients that the real-time protocol (RTP) media path has been established and that media may be transmitted from the clients.

The process 300 continues to 316, where media has been received from the clients at the MRS 104A, which is in turn transmitted to the MCU-A 110A/MCU-SB 112A pair, and/or the MCU-A 110B/MCU-SB 112B pair depending on which MCU pairs are active.

Figure 4:
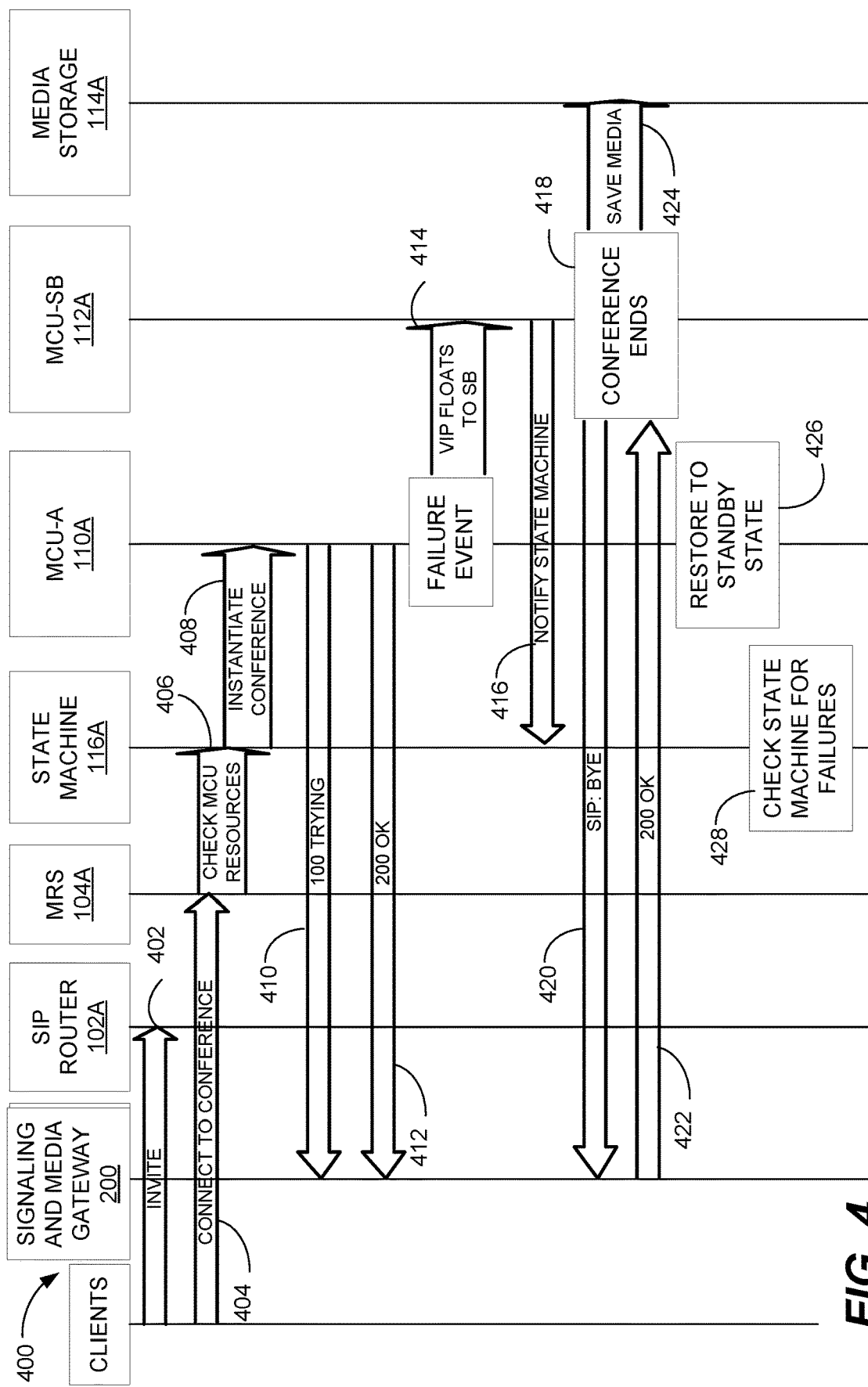
FIG. 4 is a flowchart of a process for handling an intra-site failover, in accordance with some examples of the present disclosure.

FIG. 4 is a flowchart of a process 400 for handling an intra-site failover. An intra-site failover is a failure of an active MCU, whereby the standby MCU paired with the active MCU is brought into the active mode.

The process 400 commences at 402, wherein an INVITE communication is received by the SIP Router 102A. The INVITE communication is a request by one or more clients to join a conference call on the system 100.

The process 400 continues to 404, wherein the one or more clients are registered and are connected to the system 100. In some examples, the INVITE communication may instantiate a conference call if the conference call is not already instantiated.

The process 400 continues to 406, wherein the MRS 104A access the state machine 116A to check MCU resources. In the process 400 illustrated in FIG. 4, the MCU resources include the MCU pair MCU-A 110A/MCU-SB 112A. It should be noted, however, that other pairs may be instantiated. The active and standby MCUs are in a high availability configuration whereby the media 108 is replicated between the active MCU and the standby MCU for each pair.

The process 400 continues to 408, wherein a conference is instantiated. The conference may be a parent conference or a child conference in the process 400. The process 400 is merely showing a failover process for one MCU pair.

The process 400 continues to 410, wherein a 100 TRYING communication is transmitted from the MCU-A 110A to the signaling and media gateway 200. The 100 TRYING communication is a SIP communication from the MCU-A 110A that the request of for the client to be registered on the MCU-A 110A is being processed. In some examples, the 100 TRYING communication may be a "keep alive" communication for signaling to not time out while other actions are happening, as signaling may need to occur in a relatively short period of time.

The process 400 continues to 412, wherein a 200 OK communication is transmitted from the MCU-A 110A to the signaling and media gateway 200. The 200 OK communication is a SIP communication indicating that the request by the one or more clients to join a conference call is successful.

As noted above, the process 400 illustrates an intra-site failover process whereby an active MCU fails and a standby MCU takes over as the active MCU. In this regard, the process 400 continues to 414, wherein a failure event occurs on the MCU-A 110A. The failure event can be of various types including, but not limited to, the loss of the MCU-A 110A due to a failure of the MCU-A 110A, a loss of communication with the MCU-A 110A, or a determination that the MCU-A 110A is performing at a suboptimal level. At 414, the virtual IP (VIP) address of the MCU-A 110A/MCU-SB 112B pair will float to the MCU-SB 112B, thereby making the MCU-SB 112B the active MCU. In some examples, the clients assigned to the MCU-A 110A will need to be transferred to the MCU-SB 112B. In some examples, the client may be placed in a temporary hold configuration for a period of time until the transfer from the MCU-A 110A to the MCU-SB 112B is complete. In some examples, it should be understood that IP floating to a standby MCU may the same as a standby MCU assuming a virtual IP address manually or automatically by externally controlled systems (a heartbeat to monitor a resource, an application programming interface ("API") call, a command line execution, and the like).

The process 400 continues to 416, wherein the state machine 116 is notified. The state machine 116 updates the information stored in the state machine to reflect the current configuration of the system, such as the information that the MCU-SB 112A is currently the active MCU and the MCU-A 110A is unavailable for use.

The process 400 continues to 418, wherein the conference ends. The process 400 continues to 420, wherein a SIP: BYE communication is transmitted from the MCU-SB 112A (operating as the active MCU) to the signaling and media gateway 200 to indicate that the conference has ended. The process 400 continues to 422, wherein the signaling and media gateway 200 transmits a 200 OK communication to the MCU-SB 112A acknowledging the SIP: BYE communication. When the conference ends at 418, the process 400 also continues to 424, wherein the media 108 is saved to one or more storage locations.

The process 400 continues to 426, wherein the MCU-A 110A is restored to a standby state. The MCU-A 110A may be restored as a standby MCU if the MCU-A 110A is repaired or otherwise determined to be functional at a desired or expected level of capacity. The process 400 can also include additional operations for recording failures, such as 428, wherein the state machine 116A is checked for failures of other MCUs.

Figure 5:
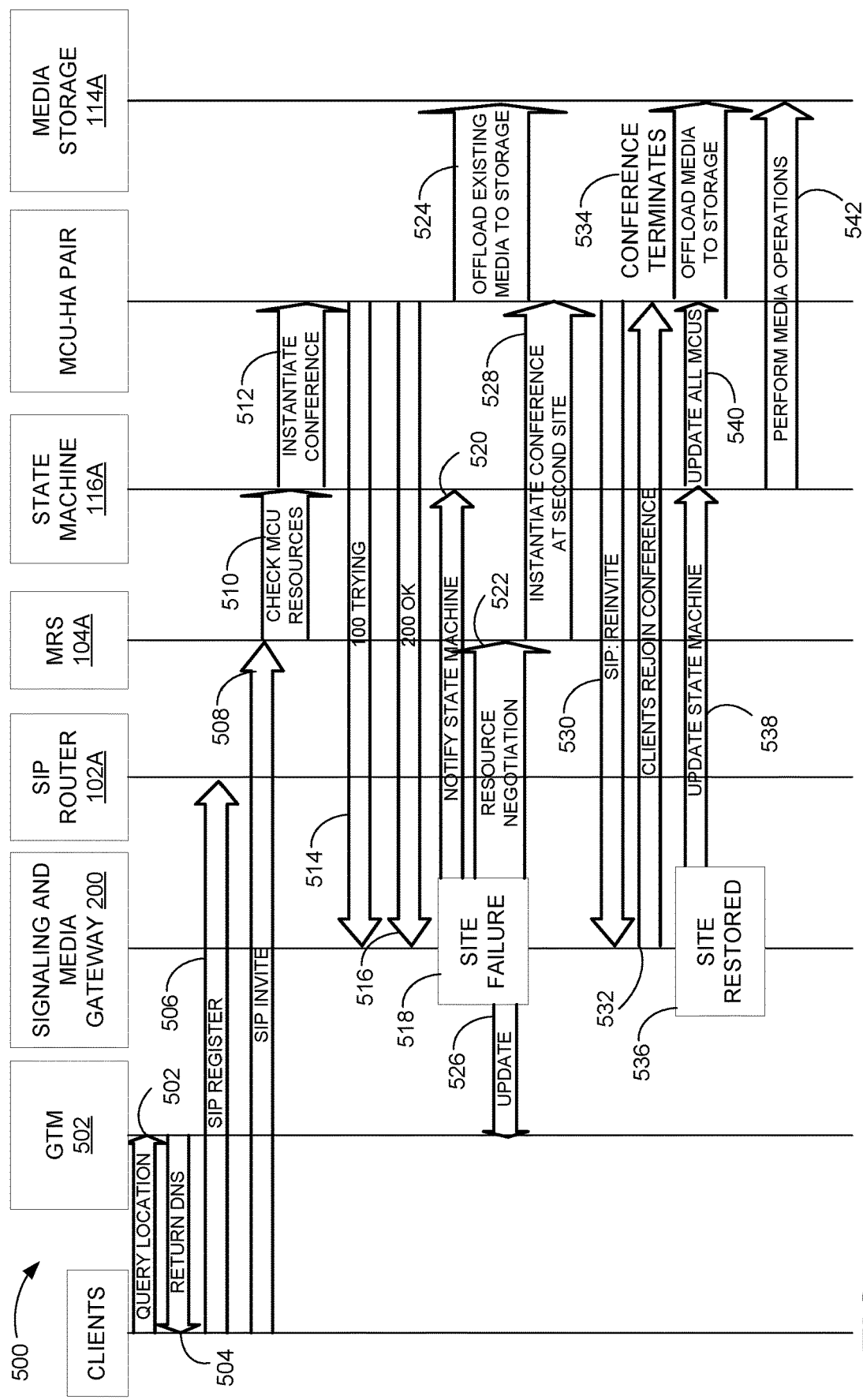
FIG. 5 is a flowchart of a process for handling an inter-site failover, in accordance with some examples of the present disclosure.

FIG. 5 is a flowchart of a process 500 for handling an inter-site failover. An inter-site failover is a failure of one conference call site (such as a geographic location or a clustered set of network resources) and transferring the conference call to another site. For example, the initial site may be conference call resource located in a city, the resources being the MRS 104A and the MCU pairs being initially used such as the MCU-A 110A/MCU-SB 112A, MCU-A 110B/MCU-SB 112B, and/or the MCU-A 110C/MCU-SB 112C. The failover site may be conference call resources in another city, the resources being the MRS 104B and the MCU pairs such as the MCU-A 110D/MCU-SB 112D, MCU-A 110E/MCU-SB 112E, and/or the MCU-A 110F/MCU-SB 112F. In the example illustrated in FIG. 5, the first site suffers a complete loss of power, whereby the conference call is transferred to a second site. It should be noted that other types of inter-site failures may occur and are considered to be within the scope of the presently disclosed subject matter.

The process 500 commences at 502, wherein clients wishing to join a conference call query a global traffic manager (GTM) 500 as to which conference call site the clients should join. The GTM 502 receives queries and determines which locations (or sites) are best suited for the clients to join.

The process 500 continues to 504, wherein the domain name system (DNS) of the server to which the clients are to join is returned to the clients.

The process 500 continues to 506, wherein a SIP REGISTER communication is received by the SIP Router 102A. The SIP REGISTER communication is a request by one or more clients to join a conference call on the system 100 at the site provided by the GTM.

The process 500 continues to 508, wherein the one or more clients are registered and are connected to the system 100 using a SIP INVITE communication. In some examples, the SIP REGISTER communication may instantiate a conference call if the conference call is not already instantiated.

The process 500 continues to 510, wherein the MRS 104A communicates with the state machine 116A to check for MCU resources. In the process 500 illustrated in FIG. 5, the MCU resources are in a high availability pair. For example, the MCU resources if in reference to the initial site, may be the MCU pair MCU-A 110A/MCU-SB 112A. The MCU resources, if in reference to the standby or backup site, may be the MCU pair MCU-A 110D/MCU-SB 112D or MCU-A 110E/MCU-SB 112E. The active and standby MCUs are in a high availability configuration when the media 108 is replicated between the active MCU and the standby MCU for each pair by the MRS 104A or the MRS 104B (depending on which MCU pairs are being used).

The process 500 continues to 512, wherein a conference is instantiated.

The process 500 continues to 514, wherein a 100 TRYING communication is transmitted from the MCU-A 110A (the active MCU in the current MCU high availability pair) to the signaling and media gateway 200. The 100 TRYING communication is a SIP communication from the MCU-A 110A that the request of for the client to be registered on the MCU-A 110A is being processed.

The process 500 continues to 516, wherein a 200 OK communication is transmitted from the MCU-A 110A to the signaling and media gateway 200. The 200 OK communication is a SIP communication indicating that the request by the one or more clients to join a conference call is successful.

As noted above, the process 500 illustrates an inter-site failover process whereby an entire site of MCUs (both active and standby in some examples) are unavailable for use. In this regard, the process 500 continues to 518, wherein a site failure has occurred. As noted above, there may be various reasons for a site failure including, but not limited to, a failure of certain components for a site, a power outage, a natural disaster, a determination that the site is operating at a suboptimal level.

The process 500 continues to 520, wherein the state machine 116A and/or the state machine 116B is updated as to the status of the site.

The process 500 continues to 522, wherein resources to maintain the conference call are negotiated with one or more second sites. In some examples, the one or more second sites include enough MCU high availability pairs with resources (either individually or collectively) to handle the transfer of the conference call from the failed MCU high availability pair to the one or more second sites.

In some examples, in response to a site failure at 518 or in response to 520 or 522, the process 500 continues to 524, wherein the media 108 stored at the media storage 114A is offloaded to a secondary media storage, such as the media storage 114B.

The process 500 continues to 526, wherein the GTM 502 is updated. The GTM 502 is updated to reduce the probability that the GTM 502 will return the DNS for the offline site in response to additional queries from clients.

The process 500 continues to 528, wherein after 522, a conference is initiated at one or more second sites. To rejoin the clients to the new conference call site, the process 500 continues to 530, wherein an SIP REINVITE communication is transmitted to the signaling and media gateway 200 so that the signaling and media gateway 200 can transfer the clients to the new MCU high availability pair.

The process 500 continues to 532, wherein the clients rejoin the conference using the MCU high availability pair(s) at the one or more second sites.

The process 500 continues to 534, wherein the conference call terminates. As part of the termination process, the media 108 is offloaded to the media storage 114A and/or 114B (if available).

The process 500 continues to 536, wherein the initial site is restored. The process 500 continues to 538, wherein the state machine 116A and or 116B is updated, as well as, 540 wherein the ALL MCUs of the initial site are updated.

The process 500 continues to 542, wherein media operations are performed to make the media 108 accessible to one or more clients. For example, the media 108 may be returned to requesting clients, additional media 108 stored prior to the site failure may be added (chronologically concatenated) to the media 108 stored after the clients are joined to the second conference. The concatenated media 108 is added and stored in the media storage 114A and/or 114B, as available. Further, the media 108 may be analyzed to determine if there are storage errors. For example, there may be fragments of the media 108 that are stored during the transfer to the one or more second sites. These fragments may be unreadable or may cause errors when reading the non-fragmented media. Thus, media fragments may be removed from the stored media 108. Other media operations may be performed and are considered to be within the scope of the presently disclosed subject matter.

Figure 6:
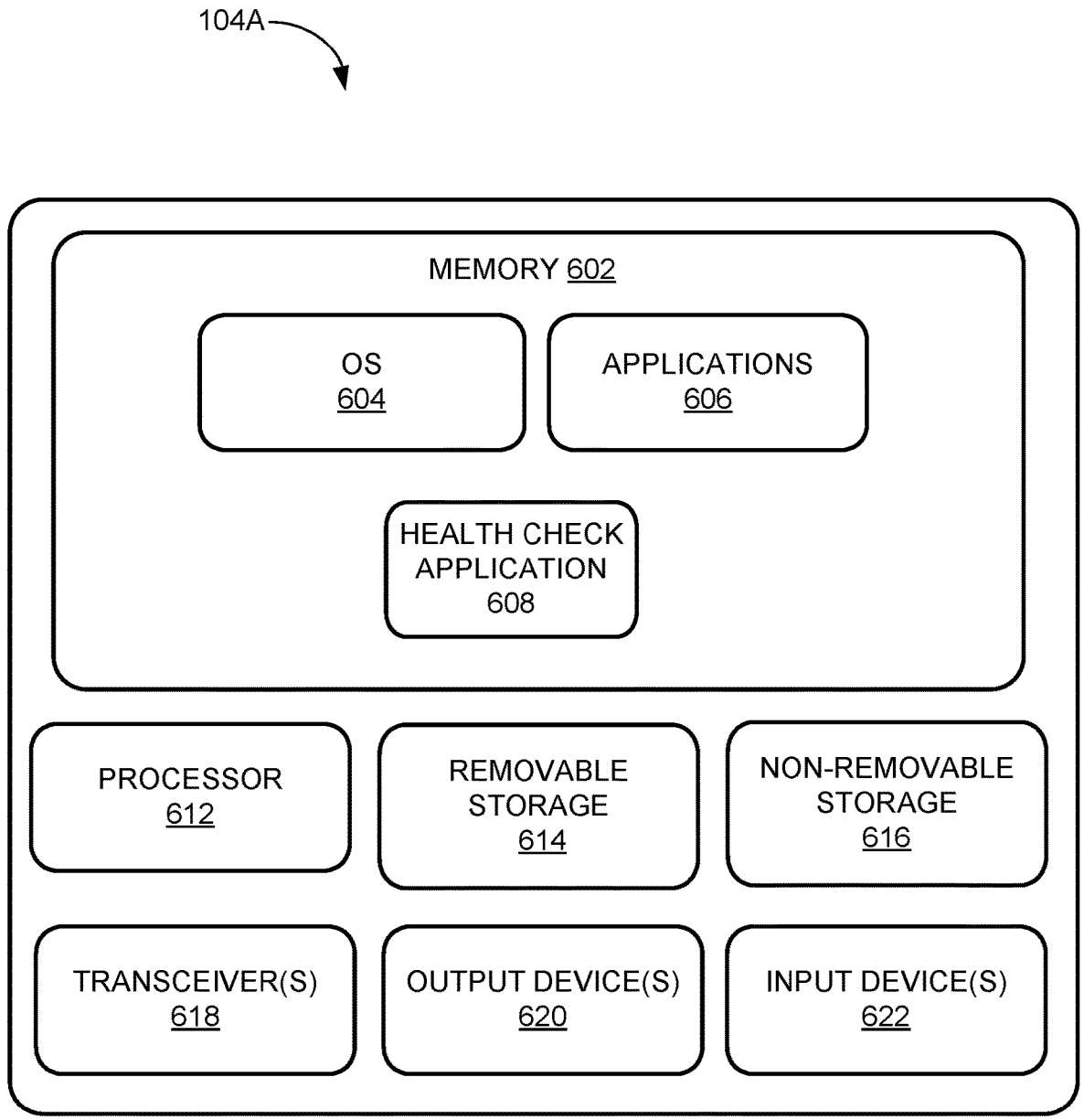
FIG. 6 depicts a component level view of a media replication server for use with the systems and methods described herein, in accordance with some examples of the present disclosure.

FIG. 6 depicts a component level view of the MRS 104A/B or the MRS 106A/B for use with the systems and methods described herein. FIG. 6 illustrates the MRS 104A by way of example. The MRS 104A/B or the MRS 106A/B could be any computing component capable of communicating with or on a cellular network, an internet multimedia subsystem, and/or an IP network. One of skill in the art will recognize that the systems and methods described herein can also be used with a variety of electronic devices, such as, for example, tablet computers, desktops, servers, and other network connected devices.

The MRS 104A can comprise several components to execute various above-mentioned functions. The MRS 104A can comprise memory 602 including an operating system (OS) 604 and one or more standard applications 606. The standard applications 606 can include many features common to conference call network components such as, for example, calendars, call logs, voicemail, etc. In this case, the standard applications 606 can also comprise a media replication operation wherein the media 108 is replicated to be sent to multiple MCU high availability pairs. The standard applications 606 can also include one or more functions or operations as those described in FIGS. 1-5, above.

The MRS 104A can also comprise a health check application 608. The health check application 608 can be an application that queries various MCUs in communication with the MRS 104A. The query can include a request to send the operational status of the MCU, any faults or issues, the current capacity of the MCU, and the like. The state machine 116A can be used to store the information queried and received using the health check application 608. The health check application 608 can query according to a schedule or upon the detection of various conditions such as, but not limited to, the addition of additional clients onto the MCUs. In other examples, health checks (such as heartbeats) may be initiated by receiving alarms pushed or broadcast out via Simple Network Management Protocol (SNMP), REST API, or another similar protocol, as well as an SIP NOTIFY communication.

The MRS 104A can also comprise one or more processors 612 and one or more of removable storage 614, non-removable storage 616, transceiver(s) 618, output device(s) 620, and input device(s) 622. In some examples, such as for network or conference call systems capable of operating as a cellular communication device, the MRS 104A can also include a SIM 624 and/or an embedded SIM (eSIM) 626, which can include a mobile country code (MCC), mobile network code (MNC), international mobile subscriber identity (IMSI), cellular phone number, and other relevant information. In some examples, one or more of the functions of the health check application 608 can be stored on the SIM 624 or the eSIM 626 in addition to, or instead of, being stored in the memory 602.

In various implementations, the memory 602 can be volatile (such as random access memory (RAM)), non-volatile (such as read only memory (ROM), flash memory, etc.), or some combination of the two. The memory 602 can include all, or part, of the health check application 104 or a URL listing, among other things. In some examples, rather than being stored in the memory 802, some, or all, of the health check application 608, and other information, such as the information stored in the state machine 116A and/or the state machine 116B can be stored on a remote server or a cloud of servers accessible by the MRS 104A.

The memory 602 can also include the OS 604. Of course, the OS 604 varies depending on the manufacturer of the MRS 104A. The OS 604 contains the modules and software that support basic functions, such as scheduling tasks, executing applications, and controlling peripherals. In some examples, the OS 604 can enable the health check application 608, and provide other functions, as described above, via the transceiver(s) 618. The OS 604 can also enable the MRS 104A to send and retrieve other data and perform other functions. It should be noted that one or more functions of the presently disclosed subject matter may be executed by other systems than the OS 604, such as firmware, field programmable gate arrays ("FPGA"), and application specific integrated circuit ("ASIC"), and the like.

The MRS 104A can also comprise one or more processors 612. In some implementations, the processor(s) 612 can be a central processing unit (CPU), a graphics processing unit (GPU), both CPU and GPU, or any other processing unit such as an application-specific integrated circuit ("ASIC") or Field Programmable Gate Arrays ("FPGA"), by way of example and not by way of limitation. The MRS 104A may also include additional data storage devices (removable and/or non-removable) such as, for example, magnetic disks, optical disks, or tape. Such additional storage is illustrated in FIG. 6 by removable storage 614 and non-removable storage 616.

Non-transitory computer-readable media may include volatile and nonvolatile, removable and non-removable tangible, physical media implemented in technology for storage of information, such as computer readable instructions, data structures, program modules, or other data. The memory 602, removable storage 614, and non-removable storage 616 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the MRS 104A. Any such non-transitory computer-readable media may be part of the MRS 104A or may be a separate database, databank, remote server, or cloud-based server.

In some implementations, the transceiver(s) 618 include any transceivers known in the art. In some examples, the transceiver(s) 618 can include wireless modem(s) to facilitate wireless connectivity with other components (e.g., between the MRS 104A and the state machine 116A), the Internet, and/or an intranet, as well as wireless network adapters or other capable equipment.

The transceiver(s) 618 may also include one or more radio transceivers that perform the function of transmitting and receiving radio frequency communications via an antenna (e.g., Wi-Fi or Bluetooth®). In other examples, the transceiver(s) 618 may include wired communication components, such as a wired modem or Ethernet port, for communicating via one or more wired networks. The transceiver(s) 818 can enable the MRS 104A to download files, access web applications, and provide other communications associated with the systems and methods, described above.

In some implementations, the output device(s) 620 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display. The output device(s) 620 can also include speakers, or similar devices, to play sounds or ringtones when an audio call or video call is received. Output device(s) 620 can also include ports for one or more peripheral devices, such as headphones, peripheral speakers, or a peripheral display.

In various implementations, input device(s) 622 include any input devices known in the art. For example, the input device(s) 622 may include a camera, a microphone, or a keyboard/keypad. The input device(s) 622 can include a touch-sensitive display or a keyboard to enable users to enter data and make requests and receive responses via web applications (e.g., in a web browser), make audio and video calls, and use the standard applications 606, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A conference call system, comprising:
    a transceiver to send and receive at least one of wired or wireless transmissions;
    memory storing computer-executable instructions; and
    a processor in communication with at least the transceiver and the memory, the computer-executable instructions causing the processor to perform acts comprising:
        in response to receiving a notification to setup a conference call, wherein the notification comprises a request for a conference call line, an indication of a number of attendees to the conference call, and a date and time of the conference call:
            instantiating an active media replication server and a standby media replication server;
            checking resources of available media control units associated with the active media replication server;
            setting up a parent conference by instantiating a first active media control unit and a first standby media control unit of the available media control units of the active media replication server, the first standby media control unit being associated with the first active media control unit;
            duplicating media received by the conference call system and transmitted the media to both the first active media control unit and the first standby media control unit;
            configuring the first active media control unit and the first standby media control unit to receive the media from the active media replication server if the active media replication server is in service or from the standby media replication server if the active media replication server is not in service and the standby media replication server is in service;
            receiving a notification that an additional number of participants are requesting to join the conference call, wherein the additional number exceeds a capacity of the parent conference;
            setting up a child conference by instantiating a second active media control unit and a second standby media control unit, the second standby media control unit being associated with the second active media control unit; and
            configuring the second active media control unit and the second standby media control unit to receive media from the active media replication server if the active media replication server is in service or from the standby media replication server if the active media replication server is not in service and the standby media replication server is in service.

2. The conference call system of claim 1, the acts further comprising:
    instantiating a first media storage to record the media transmitted during the conference call; and
    instantiating a second media storage to record the media transmitted during the conference call, wherein the second media storage is accessible to provide the media if the first media storage fails.

3. The conference call system of claim 1, the acts further comprising:
    instantiating an active/standby trunk between the first active media control unit and the first standby media control unit to allow the first standby media control unit to act as a passive participant during the parent conference.

4. The conference call system of claim 1, the computer-executable instructions further causing the processor to perform acts comprising:
    instantiating a second active media replication server and a second standby media replication server in response to receiving the conference call setup notification;
    checking resources of available media control units associated with the second active media replication server;
    instantiating a third active media control unit and a third standby media control unit as a pair; and
    configuring the third active media control unit and the third standby media control unit to receive media from the second active media replication server if the second active media replication server is in service or from a second standby media replication server if the second active media replication server is not in service and the second standby media replication server is in service.

5. The conference call system of claim 1, the computer-executable instructions further causing the processor to perform acts comprising:
    receiving a failure event notification that the first active media control unit is not operating according to a predetermined requirement;
    floating a virtual Internet protocol address to the first standby media control unit;
    transferring attendees of the parent conference to the first standby media control unit;
    storing the media; and
    updating a state machine.

6. The conference call system of claim 1, the computer-executable instructions further causing the processor to perform acts comprising:

receiving a failure event notification that a first site associated with the active media replication server is not operating according to a predetermined requirement:

in response to receiving the failure event notification, storing the media;

negotiating resources with a second active media replication server associate with a second site;

setting up a second parent conference at the second active media replication server by instantiating a third active media control unit and a third standby media control unit associated with the second active media replication server;

transferring attendees of the parent conference to the second parent conference; and updating a state machine.

7. The conference call system of claim 1, the computer-executable instructions further causing the processor to perform acts comprising:

based on monitoring health of the conference call system, configuring the second active media control unit and the second standby media control unit to stop receiving media from the active media replication server and the standby media replication server.

8. A method comprising:

receiving a notification to setup a conference call, wherein the notification comprises a request for a conference call line, an indication of a number of attendees to the conference call, and a date and time of the conference call;

instantiating an active media replication server and a standby media replication server;

checking resources of available media control units associated with the active media replication server;

setting up a parent conference by instantiating a first active media control unit and a first standby media control unit of the available media control units of the active media replication server, the first standby media control unit being associated with the first active media control unit;

duplicating media received by a conference call system and transmitted the media to both the first active media control unit and the first standby media control unit;

configuring the first active media control unit and the first standby media control unit to receive the media from the active media replication server if the active media replication server is in service or from the standby media replication server if the active media replication server is not in service and the standby media replication server is in service;

receiving a notification that an additional number of participants are requesting to join the conference call, wherein the additional number exceeds a capacity of the parent conference;

setting up a child conference by instantiating a second active media control unit and a second standby media control unit, the second standby media control unit being associated with the second active media control unit; and configuring the second active media control unit and the second standby media control unit to receive media from the active media replication server if the active media replication server is in service or from the standby media replication server if the active media replication server is not in service and the standby media replication server is in service.

9. The method of claim 8, further comprising:

instantiating an active/standby trunk between the first active media control unit and the first standby media control unit to allow the first standby media control unit to act as a passive participant during the parent conference.

10. The method of claim 8, the acts further comprising:

instantiating a first state machine to maintain a first record of activity of the parent conference; and instantiating a second state machine to maintain a second record of activity of the parent conference, wherein the second record of activity is a backup of the first record of activity.

11. The method of claim 8, further comprising:

instantiating a second active media replication server and a second standby media replication server in response to receiving the conference call setup notification;

checking resources of available media control units associated with the second active media replication server;

instantiating a third active media control unit and a third standby media control unit as a pair; and configuring the third active media control unit and the third standby media control unit to receive media from the second active media replication server if the second active media replication server is in service or from a second standby media replication server if the second active media replication server is not in service and the second standby media replication server pair is in service.

12. The method of claim 8, further comprising:

receiving a failure event notification that the first active media control unit is not operating according to a predetermined requirement;

floating a virtual Internet protocol address to the first standby media control unit;

transferring attendees of the parent conference to the first standby media control unit;

storing the media; and updating a state machine.

13. The method of claim 8, further comprising:

receiving a failure event notification that a first site associated with the active media replication server is not operating according to a predetermined requirement:

in response to receiving the failure event notification, storing the media;

negotiating resources with a second active media replication server associate with a second site;

setting up a second parent conference at the second active media replication server by instantiating a third active media control unit and a third standby media control unit associated with the third active media replication server;

transferring attendees of the parent conference to the second parent conference; and updating a state machine.

14. The method of claim 8, further comprising:

based on monitoring health of the conference call system, configuring the second active media control unit and the second standby media control unit to stop receiving media from the active media replication server and the standby media replication server.

15. A non-transitory computer-readable storage medium having computer-executable instructions stored thereupon that, when executed by a computer, cause the computer to perform acts comprising:

in response to receiving a notification to setup a conference call, wherein the notification comprises a request for a conference call line, an indication of a number of attendees to the conference call, and a date and time of the conference call:

instantiating an active media replication server and a standby media replication server;

checking resources of available media control units associated with the active media replication server;

setting up a parent conference by instantiating a first active media control unit and a first standby media control unit of the available media control units of the active media replication server, the first standby media control unit being associated with the first active media control unit;

duplicating media received by a conference call system and transmitted the media to both the first active media control unit and the first standby media control unit;

configuring the first active media control unit and the first standby media control unit to receive the media from the active media replication server if the active media replication server is in service or from the standby media replication server if the active media replication server is not in service and the standby media replication server is in service;

receiving a notification that an additional number of participants are requesting to join the conference call, wherein the additional number of participants exceeds a capacity of the parent conference;

setting up a child conference by instantiating a second active media control unit and a second standby media control unit, the second standby media control unit being associated with the second active media control unit; and configuring the second active media control unit and the second standby media control unit to receive media from the active media replication server if the active media replication server is in service or from the standby media replication server if the active media replication server is not in service and the standby media replication server is in service.

16. The non-transitory computer-readable storage medium of claim 15, the acts further comprising:

instantiating an active/standby trunk between the first active media control unit and the first standby media control unit to allow the first standby media control unit to act as a passive participant during the parent conference.

17. The non-transitory computer-readable storage medium of claim 15, the computer-executable instructions further causing the computer to perform acts comprising:

instantiating a second active media replication server and a second standby media replication server in response to receiving the conference call setup notification;

checking resources of available media control units associated with the second active media replication server;

instantiating a third active media control unit and a third standby media control unit as a pair; and configuring the third active media control unit and the third standby media control unit to receive media from the second active media replication server if the second active media replication server is in service or from the second standby media replication server if the second active media replication server is not in service and a second standby media replication server is in service.

18. The non-transitory computer-readable storage medium of claim 15, the computer-executable instructions further causing the computer to perform acts comprising:

receiving a failure event notification that the first active media control unit is not operating according to a predetermined requirement;

floating a virtual Internet protocol address to the first standby media control unit;

transferring attendees of the parent conference to the first standby media control unit;

storing the media; and updating a state machine.

19. The non-transitory computer-readable storage medium of claim 15, the computer-executable instructions further causing the computer to perform acts comprising:

receiving a failure event notification that a first site associated with the active media replication server is not operating according to a predetermined requirement:

in response to receiving the failure event notification, storing the media;

negotiating resources with a second active media replication server associate with a second site;

setting up a second parent conference at the second active media replication server by instantiating a third active media control unit and a third standby media control unit associated with the third active media replication server;

transferring attendees of the parent conference to the second parent conference; and updating a state machine.

20. The non-transitory computer-readable storage medium of claim 15, the acts further comprising:

based on monitoring health of the conference call system, configuring the second active media control unit and the second standby media control unit to stop receiving media from the active media replication server and the standby media replication server.

* * * * *